United States Patent [19]
Robbins et al.

[11] Patent Number: 5,678,450
[45] Date of Patent: Oct. 21, 1997

[54] ADJUSTABLE MEASUREMENT CONTAINER

[75] Inventors: E. Stanley Robbins, Killen; Frans M. Weterrings, Tuscumbia; Rodney W. Robbins, Florence, all of Ala.

[73] Assignee: Robbins Indusxries, Inc., Florence, Ala.

[21] Appl. No.: 344,075

[22] Filed: Nov. 23, 1994

[51] Int. Cl.⁶ .................................................. G01F 19/00
[52] U.S. Cl. .................................................. 73/429; 73/426
[58] Field of Search .............................. 73/426, 427, 428, 73/429

[56] References Cited

U.S. PATENT DOCUMENTS

| | | | |
|---|---|---|---|
| D. 163,681 | 6/1951 | Cottrell. | |
| D. 253,869 | 1/1980 | Wells | D8/2 |
| D. 328,867 | 8/1992 | Watt et al. . | |
| D. 344,686 | 3/1994 | Weterrings . | |
| 1,324,264 | 12/1919 | Parent | 73/429 |
| 2,555,956 | 6/1951 | Chester | 73/429 |
| 2,569,703 | 10/1951 | Weiland | 73/429 |
| 2,626,526 | 1/1953 | Chester | 73/429 |
| 2,697,353 | 12/1954 | Setecka | 73/429 |
| 2,854,849 | 10/1958 | Setecka | 73/429 |
| 3,690,182 | 9/1972 | Rodriguez | 73/429 |
| 5,182,948 | 2/1993 | Robbins et al. | 73/426 |
| 5,325,717 | 7/1994 | Robbins et al. | 73/429 |
| 5,460,042 | 10/1995 | Tucker | 73/429 |

OTHER PUBLICATIONS

Calaware measuring spoons; published mounting cards (1994) and unpublished drawings; spoons sold since Apr.–May 1994.

*Primary Examiner*—Thomas B. Will
*Attorney, Agent, or Firm*—Curtis, Morris & Safford, P.C.; Gregor N. Neff

[57] ABSTRACT

An adjustable spoon or scoop with a measuring container on each end. The spoon has a sliding cover with dams for adjusting the volumes in the measurement containers at both ends. The cover can be easily snapped off of the spoon body to separate the parts for easy washing. The dimensions of the containers at opposite ends of the spoon are set to cover different volume ranges; for example, ⅛ teaspoon to 1 teaspoon at one end, and 1 teaspoon to 1 tablespoon at the other end. Coordinated indicia are provided to indicate the measurements corresponding to each position of the slider. The dimensions of the measurement containers are determined so that a standard fractional measurement will be provided at both ends of the spoon by each of a plurality of sequential slider locations. The body has a slender central portion extending between the measurement containers. An internal vertical rib is used to strengthen the central portion while keeping it slender, and a second rib, perpendicular to the first rib, serves as a dam to impede the flow of liquids from one container to the other.

17 Claims, 4 Drawing Sheets

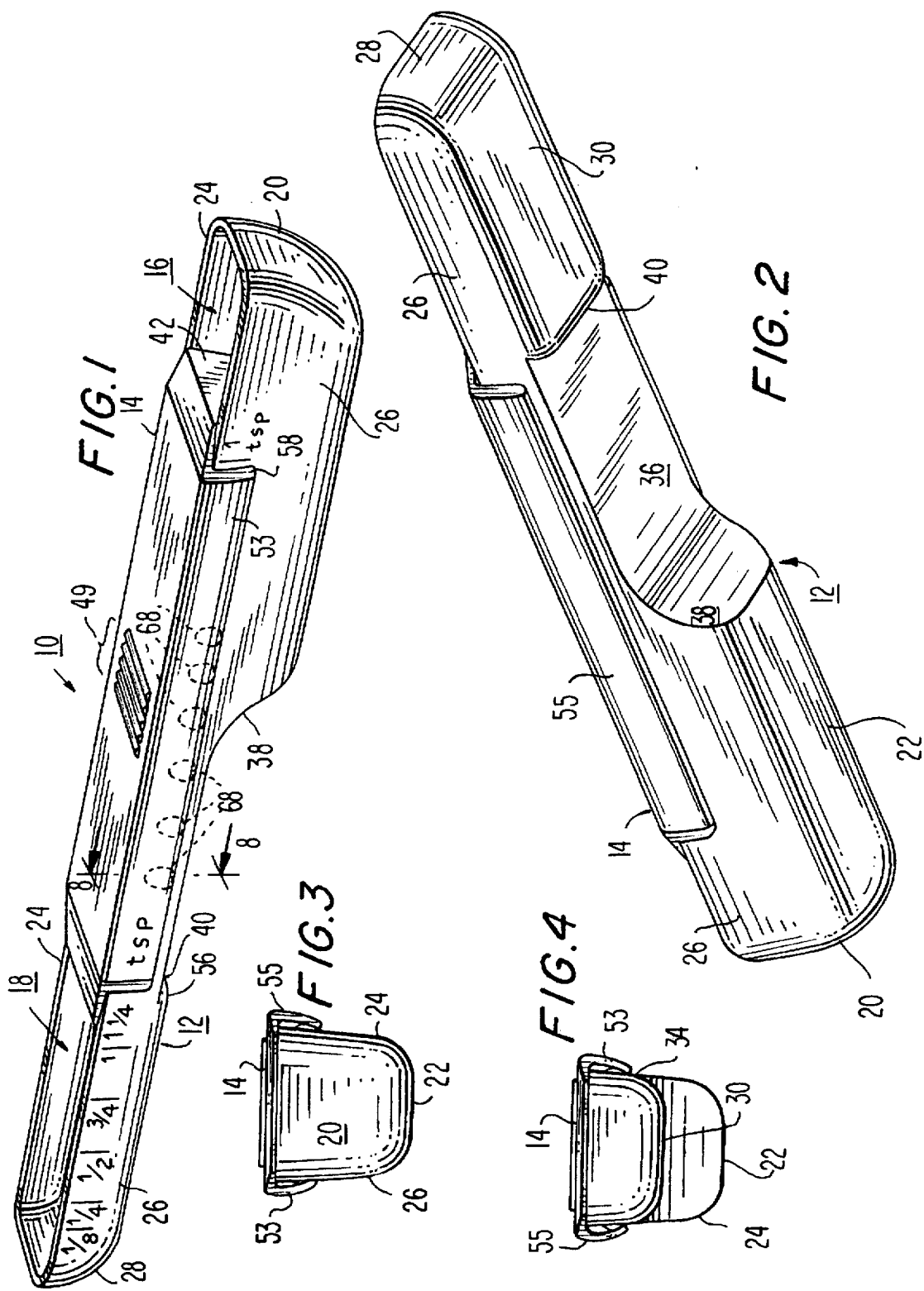

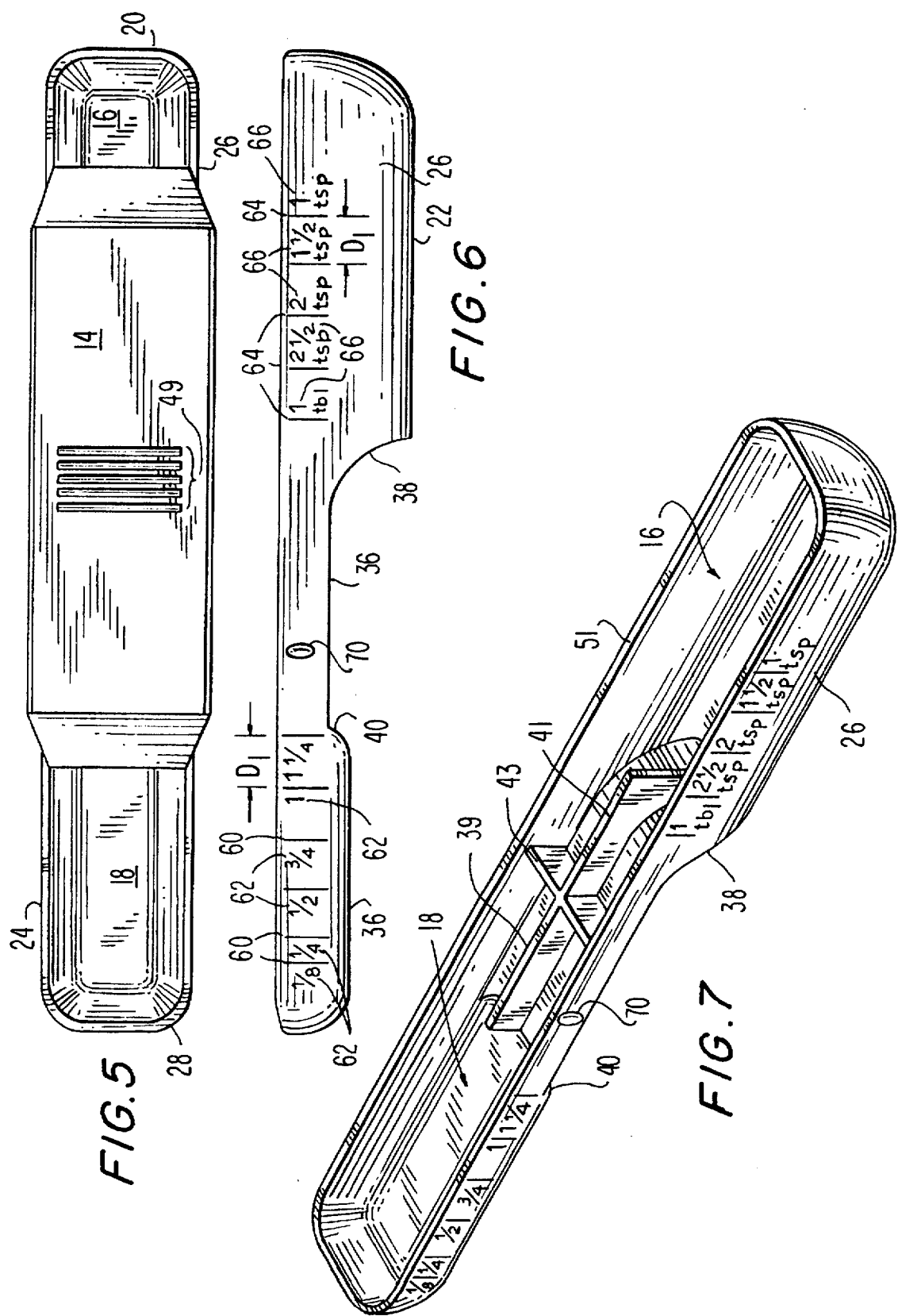

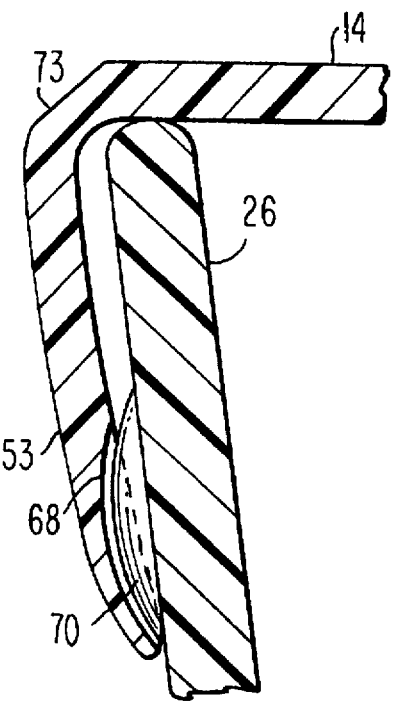
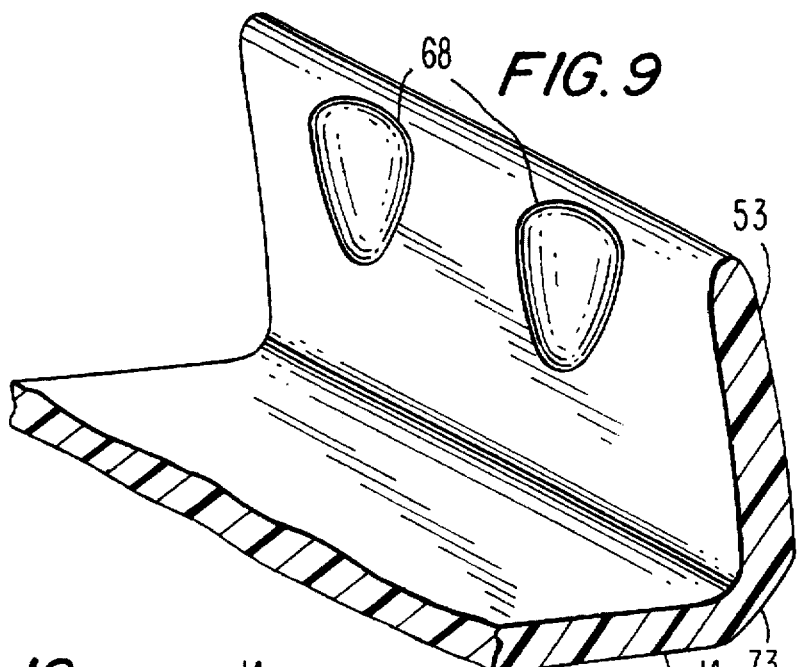
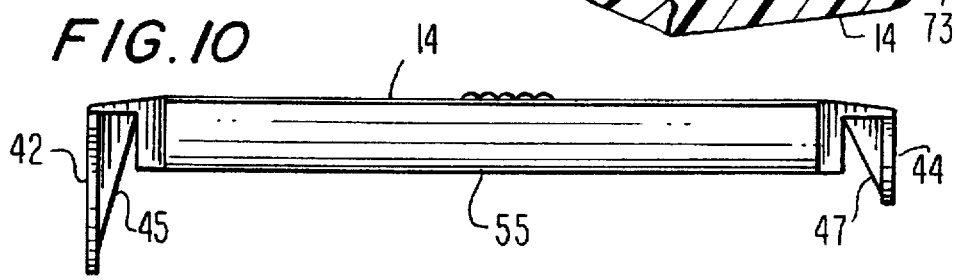
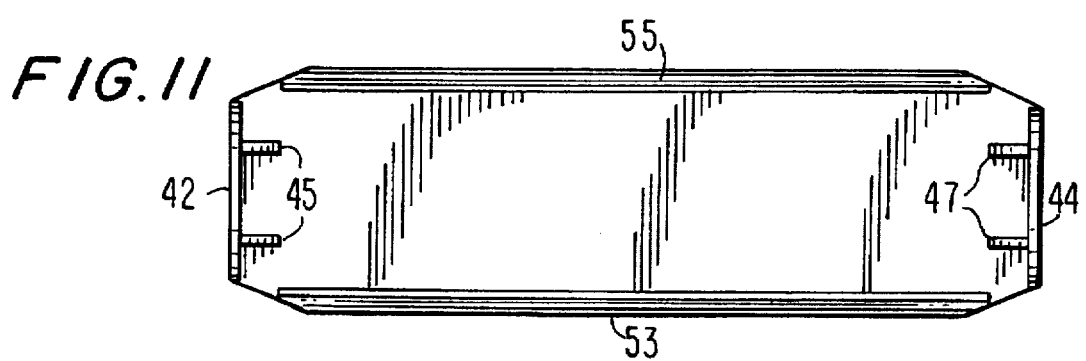

ADJUSTABLE MEASUREMENT CONTAINER

This invention relates to adjustable measurement containers, and particularly to adjustable measurement spoons and scoops.

Adjustable measuring spoons of many types have been proposed and sold in the past. A particularly successful type of measuring spoon is shown in U.S. Pat. Nos. 5,182,948 and D-328,867, both of which are assigned to the same assignee as this patent application. Both of those patents show an adjustable measuring spoon with a measuring container at one end only.

Others, over a period of many years, have suggested double-ended measuring spoons and scoops, in which a measuring container is positioned at each end of the device, usually with one of the containers having a different range of volume measurements than the other one. Such a concept offers economy because the user does not have to purchase separate spoons of two different ranges to obtain the same range of variability.

Such prior double-ended spoons have suffered from various problems. One problem with at least some of the prior double-ended spoons which have been sold is that the sliding cover is deliberately made relatively difficult to remove, apparently on the theory that it is desirable to keep the parts together, and that sanitation could be ensured by washing such spoons in a dishwasher. It is believed that such washing is neither effective nor safe for sanitary purposes, in that unwanted residues will build up under the sliding dams used in the measuring containers and will breed harmful germs—especially if washing is delayed for a substantial period of time, or is not conducted correctly, or in the instances in which the spoons are washed by hand.

Accordingly, an object of the present invention is to provide a double-ended measuring container or spoon in which the slider or cover is releasably secured to a body member but is easy to remove by merely snapping it off of the body member to separate the parts for easy washing.

Another problem with such prior double-ended measurement containers is that a relatively large number of settings of the slide is required in order to use the various measurements provided by both ends of the spoon. If a detent mechanism is used, this also means that a relatively large number of detent positions must be provided, with accompanying mechanical complexity.

Accordingly, it is another object of the present invention to minimize or eliminate the latter problem.

A further problem with some prior double-ended measurement containers is that they are structurally complex, with a tendency to break relatively easily, especially when someone attempts to separate the sliding cover from the body member.

Therefore, it is another object of the invention to reduce the complexity of the structure and the tendency towards breakage.

In accordance with the present invention, the foregoing objectives are met by the provision of a double-ended measurement container in which a single sliding cover with a dam at each end is provided to resiliently snap off of a body member. The cover has flanges which resiliently grip the outsides of the body member. The grip of the flanges on the sides of the body member is released relatively easily simply by pulling up on the sliding cover. The cover is replaced simply by pressing it onto the body member.

The cover structure and structure of the body member are relatively simple and easy to mold out of plastic.

The number of different settings required for use of the device is minimized, and the number of detents required is minimized, by the use of a "coordinated indicia" feature. The coordinated indicia feature includes the dimensioning of each of the two measuring receptacles in a way so that each of several successive different settings of the sliding cover will produce two different marked measurements, one at each end of the device.

For example, in the preferred embodiment disclosed herein, when the slider is at a first detent position, a measurement of 1½ teaspoons is provided at one end, and ¾ of a teaspoon at the other end. Similarly, at the next setting, a measurement of 2 teaspoons is produced at one end and ½ teaspoon at the other end, and so forth.

In the coordinated indicia feature, the spacing between corresponding positions of the sliding dams at each end of the spoon is the same. That is, for example, the spacing between the dam positions producing measurements of 1 teaspoon and 1½ teaspoon at one end is substantially equal to the spacing between the dam positions producing measurements of 1 teaspoon and ¾ of a teaspoon at the other end, so that each of several successive positions of the sliding cover produces measurement receptacles each having a standard unit of measurement, or fraction thereof, at each end.

In one embodiment of the invention, the indicia or markings for the spoon subdivisions are provided on one or both of the sides of either the body member or the sliding cover.

By means of the coordinated indicia feature, the number of positions that the slider must be adjusted to by the user has been reduced, as has the number of detents in the detent mechanism. Furthermore, the spacing between indicia is more nearly uniform. This simplifies application of the indicia, and can make them easier to read.

A problem with some prior adjustable spoons is that the area grasped by the user does not have as smooth a look or feel as might be desired. As always, it also is desired that the amount of material used be minimized to minimize the cost of manufacturing.

The foregoing problems are met by providing a relatively slender, smooth, central portion of the body joining the measuring receptacles. Instead of external flanges, at least one internal longitudinal rib extending along the central portion is used to give structural strength. Preferably, a cross-rib also is provided. The cross-rib also strengthens the structure, and impedes the flow of liquids from one end of the spoon to the other.

In accordance with a further feature of the invention, a finger-receiving recess is provided in the cover. This facilitates the sliding of the slider.

Other objects and advantages of the present invention will be set forth in or apparent from the following description and drawings.

In The Drawings:

FIG. 1 is a top front perspective view of one embodiment of the double-ended spoon of the invention;

FIG. 2 is a bottom rear perspective view of the spoon shown in of FIG. 1;

FIG. 3 is a right end elevation view of the spoon shown in FIG. 1;

FIG. 4 is a left end elevation view of the spoon of FIG. 1;

FIG. 5 is a top plan view of the spoon of FIG. 1;

FIG. 6 is a side elevation view of the body member of FIG. 1, with the sliding cover removed;

FIG. 7 is a perspective view of the body member of FIGS. 1 and 6;

FIG. 8 is an enlarged broken away cross-sectional view taken along line 8—8, of FIG. 1;

FIG. 9 is an enlarged, inverted, broken-away perspective view of a portion of the device shown in FIG. 1;

FIG. 10 is a side elevation view of the slider of the device shown in FIG. 1;

FIG. 11 is a bottom plan view of the slider shown in FIG. 10;

Figure 12:
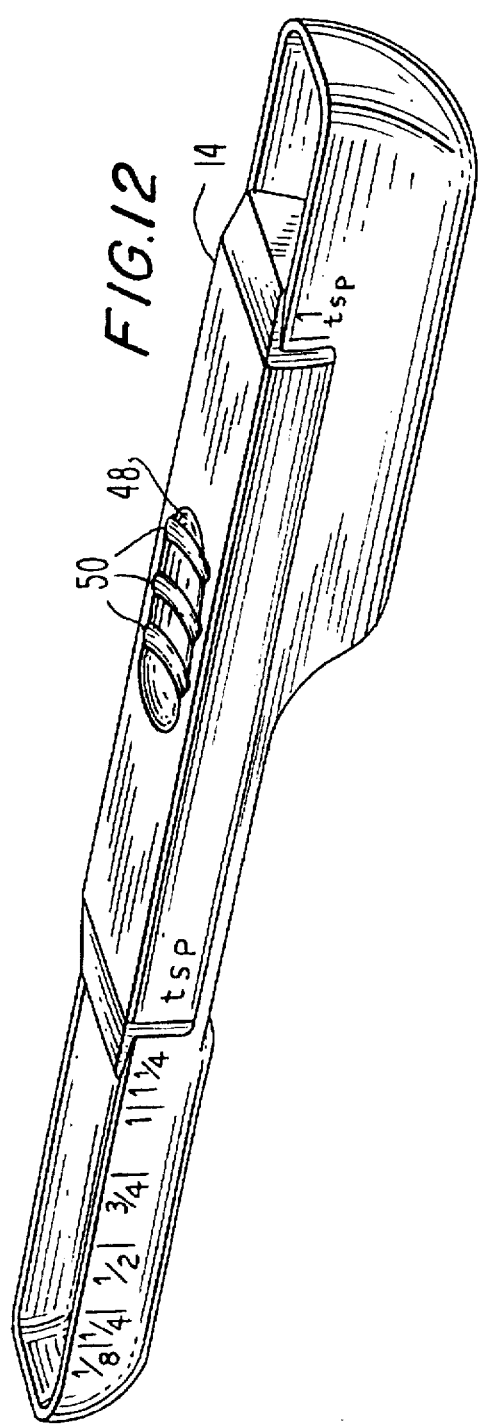
FIG. 12 is a perspective view of an alternative embodiment of the invention.

A preferred form of the spoon is shown at 10 in FIG. 1. The spoon 10 includes a molded plastic body member 12 and a separately molded sliding cover or "slider" 14 slidably mounted on the body member 12.

The body member 12 has a pair of bowls 16 and 18 at opposite ends of the spoon. The bowl 16 is relatively deep, and the bowl 18 is relatively shallow.

The deep bowl 16 is used to measure relatively large amounts of materials, such as condiments, liquids, etc., in the range of from one teaspoon to one tablespoon, for example.

The shallow bowl 18 at the opposite end of the spoon is adapted to measure relatively smaller quantities of the same types of materials, e.g., from 1/8th teaspoon to 1 teaspoon.

As it is shown in FIGS. 1, 10 and 11, the slider 14 has a relatively long dam member 42 at one end, and a relatively short dam member 44 at the other end.

Each of the dam members 42 and 44 is shaped to fit into the interior contours of the bowl so as to form a relatively tight fit with the interior of the bowl to minimize leakage of materials past the dam.

The slider has a plurality of short, upstanding ridges 49 (FIGS. 1 and 5) located centrally on the top of the slider. The ridges 49 are perpendicular to the longitudinal axis of the slider. They serve to aid the grip of the user in pushing or pulling the slider, as well as being ornamental.

As it is shown in FIGS. 10 and 11, gussets 45 and 47 are provided to strengthen the slider at the junctions between the dams 42 and 44 and the remainder of the slider structure.

Referring to both FIGS. 1 and 2, body member 12 has two opposite longitudinal side walls 24 and 26.

The deep bowl 16 has a sloping end wall 20, and a bottom wall 22. The shallow bowl 18 includes a sloping end wall 28, and a bottom wall 30.

A rounded, sloping rear wall 38 for the bowl 16, and a short, rounded rear wall 40 for the bowl 18 are connected by a section of reduced height forming a bottom wall 36.

The rear wall 38 in the bowl 16, together with a rib 41 shown in FIG. 7, forms a rear stop for the dam member 42 when it is moved towards the left. The rear wall 40 of the shallow bowl 18, together with a rib 39 shown in FIG. 7, forms a rear stop for the dam member 44 to limit the travel of the slider when it is moved towards the right.

Referring to FIGS. 1, 3 and 4, the slider 14 has a pair of depending flanges 53 and 55 at opposite sides. Along one side, the side facing the viewer in FIG. 1, the flange 53 is cut away at opposite corners to form edges 56 and 58 so as to expose certain indicia and numerals on both side walls 26 and 24 of the body member 12. The markings can be either printed or embossed on the body member. Embossing the indicia and numerals in the molding process is preferred because it saves the cost of a separate printing step.

FIG. 6 shows the indicia 60 and 64, e.g., and numerals 62 and 66, e.g., more clearly than in FIG. 1. At the deep bowl end, the volume measured also is printed or embossed. At the shallow end, the volume is marked on the slider 14. (See FIG. 1.)

Although indicia in the form of vertical lines are provided, it should be understood that the numerals themselves can serve as measurement indicia.

Referring now to FIGS. 6 and 8, the side wall 26 has a rounded projection or bump 70 extending from it which serves as part of a detent mechanism.

As it is shown in FIGS. 1 and 9, on the inside surface of the flange 53 is a series of indentations 68 which form part of the detent mechanism. There is one such indentation 68 for each of the different measurement positions of the slider 14, six in this case. The detent mechanism allows the user to feel the "click" when the slider moves into a proper measurement position. This enhances the accuracy of the spoon.

Referring again to FIG. 7, in addition to the vertical ribs 39 and 41, which actually form a single rib, there is provided another vertical rib 43 which is perpendicular to ribs 39 and 41 and extends between the side-walls 24 and 26.

The ribs 39 and 41 not only serve as stops, but they also give structural rigidity to the central section of the spoon, while allowing the exterior of that section to be smooth and slender.

The rib 43 also serves to strengthen the spoon, but serves a second function too. The rib 43 serves as a dam to prevent or minimize the flow of liquids from one end of the spoon to the other.

The use of the internal ribs 39, 41 and 43 instead of external flanges not only keeps the spoon slender and sleek in appearance and feel, but it also saves plastic material and thus reduces manufacturing costs.

The upper edges of the ribs 39, 41 and 43 are recessed below the upper edge 51 of the body member so as to provide clearance for the recessed finger receptacle in the top of the slider in the embodiment shown in FIGS. 12 and 13. By means of this feature, the same body member 12 can be used in both embodiments of the invention, so that only the slider need be different.

In U.S. Pat. No. 5,182,948, assigned to the same assignee, an advantageous feature of the spoon is that the cover or slider 14 can be removed quickly and easily by merely "snapping" it off of the body member by pulling upwardly on it.

As it is shown in FIGS. 3 and 4, the slider 14 also can be "snapped" off of the body member. The inner edges of the flanges 53 and 55 normally grip the sides 24 and 26 of the body member, which slope inwardly (see FIGS. 3 and 4). The slider 14 is made with beveled corners 73 (FIGS. 8 and 9) so as to reduce the thickness of the material at the corners and make the flanges 53 and 55 relatively flexible. Thus, when the slider is lifted upwardly or pressed downwardly by the user, the flanges 53 and 55 flex outwardly and allow the cover to be removed or replaced easily. This greatly facilitates washing to prevent the build up of debris and bacteria underneath the slider member 14.

COORDINATED INDICIA FEATURE

In accordance with one aspect of the present invention, the dimensions of each bowl 16 and 18 are determined so that each of a sequence of volume markings or indicia for the deep bowl 16 correspond substantially exactly with one of a sequence of volume measurements or indicia for the shallow bowl 18. The edges of the slider 14 at 56 and 58 are used to indicate the slider position. For example, when the slider 14 is all the way to the right, as shown in FIG. 1, with the edge 58 pointing to the one teaspoon mark, the edge 56 at the opposite end of the spoon will be aligned with the 1¼ teaspoon mark for the left hand bowl 18. One of the indentations 68 is located so that the projection 70 fits into it when the slider is at the position shown in FIG. 1.

When the slider is moved one detent position to the left, the edge 58 will be aligned with the 1½ teaspoon mark, and the edge 56 will be aligned with the 1 teaspoon mark. In order to facilitate this, the distance $D_1$ (FIG. 6) between the 1 and 1½ teaspoon measurements on the side of the bowl 16 is made equal to the distance $D_1$ between the ¼ and 1 teaspoon measurement on the side of the bowl 18. Another indentation, located at the same distance $D_1$ from the previously-mentioned indentation, provides a detent for this position of the slider.

Similarly, the distance between the measurements of 1½ and 2 teaspoons on the large bowl 16 is equal to the distance between the 1 and ¾ teaspoon measurements in the shallow bowl 18. A detent also marks this and each other slider location.

Except for the ⅛ teaspoon measurement at the left end of the spoon, each of the measurements is spaced from its neighbor by the same distance $D_1$. Also, the distance between corresponding indicia, at opposite ends of the spoon, is made equal to the distance between the edges 56 and 58.

The result is that at each of the first five slider locations, each of the bowls 16 and 18 has one of the volumes marked on the side of the spoon.

The volumes marked on the right side of the spoon progress in ½ teaspoon steps, and those on the left side in ¼ teaspoon steps, except for the step from ¼ teaspoon to ⅛ teaspoon. The volumes marked are believed to be the ones most frequently used by consumers.

The coordinated indicia feature involves the careful dimensioning of the bowls to minimize the number of detents required and minimize the amount of manipulation of the slider required by the user. The way in which this is accomplished follows.

First, the width of the bowls 16 and 18 (the width of the body member 12) is determined. This width preferably is the maximum width which will allow the spoon to enter the openings of spice jars or bottles or other such containers.

Next, the length of each bowl needed to give the desired range of measurements is determined.

Finally, the depth of each bowl needed to give the desired volume increments with constant spacing of indicia is determined.

The length and depth of the bowls can be adjusted until the proper dimensions have been determined empirically.

ALTERNATIVE EMBODIMENT

Figure 13:
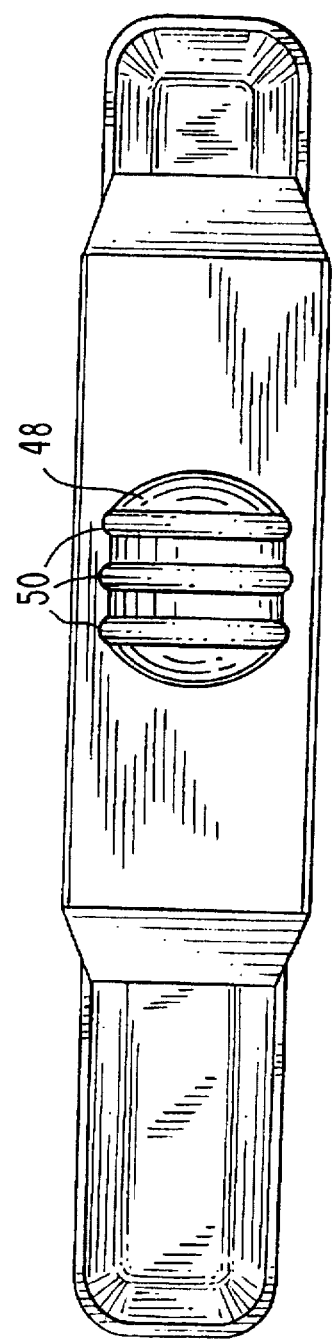
FIG. 13 is a top plan view of the embodiment shown in FIG. 12.

An alternative embodiment of the invention is shown in FIGS. 12 and 13. The construction of this embodiment is the same as that already described, except for the slider.

The slider 14 has a central generally round recess 48 with three parallel, relatively wide grooves 50. The recess 48 and the grooves 50 are provided both for decoration and for better gripping of the slider member with the thumb to push it forwardly or pull it backwardly.

This invention can be practiced in many different forms other than the specific forms described above. These specific forms are described in order to set forth the best mode presently contemplated for carrying out the invention. However, the protection of this patent should not be limited to those forms and should be interpreted to cover other measuring containers utilizing the spirit and inventive contribution of this invention.

We claim:

1. A measuring container having a body member with first and second ends,
   a first measuring receptacle at said first end, and a second measuring receptacle at said second end,
   said first measuring receptacle being adapted to measure substantially larger quantities than said second measuring receptacle,
   a sliding dam member slidably attached to said body member and having first and second ends, a first dam element at said first end of said sliding dam member extending into said first receptacle and shaped to conform to the shape of said first receptacle, a second dam element at said second end of said sliding dam member extending into said second receptacle and shaped to conform to the shape of said second receptacle,
   indicia on one of said body member and said sliding dam member marking a plurality of locations of said sliding dam member corresponding to different pre-determined measurements in said receptacles, the dimensions of said receptacles being such that the spacing of each of a plurality of successive adjacent ones of said locations in said first receptacle is substantially equal to the spacing of each of a plurality of successive adjacent ones of said locations in said second receptacle.

2. A measuring container as in claim 1 in which each of said successive locations in said first receptacle is spaced from a corresponding one of said locations in said second receptacle by a constant distance.

3. A measuring container as in claim 1 in which the spacing of each of a plurality of successive adjacent ones of said locations for each of said receptacles is a constant fraction of a measurement.

4. A measuring container as in claim 3 in which the fraction for one of said receptacles is different from the fraction for the other of the said receptacles.

5. A measuring container as in claim 1 including a detent mechanism for identifying each of said locations.

6. A measuring container as in claim 1 in which said body member has side walls and said sliding dam member has flanges adapted to releasably grip said side walls of said body member to hold said sliding dam member onto said body member but allow said sliding dam member to be removed by hand for cleaning.

7. A measuring container as in claim 1 in which said body member has a plurality of side walls and said sliding dam member has a plurality of edges, said indicia being located on one of said edges and said side walls.

8. A measuring container as in claim 1 in which said indicia include two groups of markings, one near said first end of said body member, and the other near said second end of said body member, the distances between markings in said first group being substantially the same as between corresponding markings in said second group.

9. A measuring container as in claim 1 in which each of said receptacles has side walls and said indicia are marked on at least one of said side walls of each of said receptacles, said sliding dam member has flanges and said flanges have end edges, each of said end edges being adapted to be aligned with said indicia to indicate the volume of one of said receptacles.

10. A measuring container as in claim 1 in which said sliding dam member has a cover with a finger-receiving recess therein for gripping said sliding dam member.

11. A measuring container having a body member with first and second ends,
   a first measuring receptacle at said first end, and a second measuring receptacle at said second end, said first measuring receptacle being adapted to measure substantially larger quantities than said second measuring receptacle, a sliding dam member slidably attached to said body member and having first and second ends, a first dam element at said first end of said sliding dam member extending into said first receptacle and shaped to conform to the shape of said first receptacle, a second dam element at said second end of said sliding dam member extending into said second receptacle and shaped to conform to the shape of said second receptacle, indicia on one of said body member and said sliding dam member marking a plurality of locations of said sliding dam member corresponding to different pre-determined measurements in said receptacles, the dimensions of said receptacles being such that the spacing of each of a plurality of successive, adjacent ones of said locations in said first receptacle is substantially equal to the spacing of each of a plurality of successive ones of said locations in said second receptacle, said spacing of each of a plurality of successive adjacent ones of said locations for each of said receptacles being a constant fraction of a measurement, and wherein said fraction for the second one of said receptacles is one-quarter teaspoon, and the fraction for the first one of said receptacles in one-half teaspoon.

12. A measuring container having body member with first and second ends, a first measuring receptacle at said first end, and a second measuring receptacle at said second end, a sliding dam member slidably attached to said body member and having first and second ends, a first dam element at said first end of said sliding dam member extending into said first receptacle and shaped to conform to the shape of said first receptacle, a second dam element at said second end of said sliding dam member extending into said second receptacle and shaped to conform to the shape of said second receptacle, said receptacles having upper edges, said body member having a central portion between said first and second receptacles, said central portion having a bottom wall substantially below said upper edges of said receptacles, and at least one rib extending longitudinally along and upwardly from said bottom wall within said body member said central portion also including a second rib perpendicular to said first rib and extending between said side walls to impede the flow of liquids between said receptacles.

13. A measuring container as in claim 12 wherein said measuring container is molded and said receptacles have side walls, the thickness of said side walls being substantially the same as the thickness of the bottom wall of said central portion and said ribs.

14. A measuring container as in claim 12, in which said body member has side walls, and in which said sliding dam member has depending flanges adapted to releasably grip said side walls of said body member to releasably hold said sliding dam member onto said body member but allow said sliding dam member to be removed by hand for cleaning.

15. A measuring container as in claim 14 in which bottom wall further includes two end portions, each forming the bottom wall of one of said receptacles, said sliding dam member having a top wall extending between said dam elements, and including a recess in said top wall sized to receive the finger of a user of said measuring container to grip said sliding dam member to slide it on said body member, said ribs being located substantially below the upper edges of said side walls to give clearance for the recessed portion of said top wall.

16. A measuring container as in claim 12 including indicia on one of said body member and said sliding dam member marking a plurality of locations of said sliding dam member corresponding to different pre-determined measurements in said receptacles, the dimensions of said receptacles being such that the spacing of each of a plurality of successive ones of said locations in said first receptacle is substantially equal to the spacing of each of a plurality of successive ones of said locations in said second receptacle.

17. A measuring container as in claim 12 in which said longitudinally extending rib has vertical end edges, each being located at one end of one of said receptacles to serve as a stop to limit the movement of one of said dam elements in a given direction.

* * * * *